COLOR TELEVISION SIGNAL CONVERTER

Filed Oct. 14, 1966 3 Sheets-Sheet 1

INVENTOR.
RENVILLE H. McMANN, JR.
BY
Brumbaugh, Free, Graves & Donohue
his ATTORNEYS April 14, 1970 R. H. McMANN, JR 3,506,775

COLOR TELEVISION SIGNAL CONVERTER

Filed Oct. 14, 1966 3 Sheets-Sheet 2

INVENTOR.
RENVILLE H. McMANN, JR.
BY
Brumbaugh, Free, Graves & Donahue
his ATTORNEYS

COLOR TELEVISION SIGNAL CONVERTER

INVENTOR.
RENVILLE H. McMANN, JR.
BY
Brumbaugh, Free, Graves & Donohue
his ATTORNEYS

United States Patent Office 3,506,775
Patented Apr. 14, 1970

3,506,775
COLOR TELEVISION SIGNAL CONVERTER

Renville H. McMann, Jr., New Canaan, Conn., assignor to Columbia Broadcasting System, Inc., New York, N.Y., a corporation of New York Filed Oct. 14, 1966, Ser. No. 586,731
Int. Cl. H04n *9/02, 5/78, 9/42*
U.S. Cl. 178—5.2 15 Claims

ABSTRACT OF THE DISCLOSURE

A color television signal production system providing simultaneous color field signals from sequentially produced color field signals. The sequential signals are made simultaneous by delaying two of the color component signals the time necessary to cause their simultaneous occurrence with a further instantaneous color component signal. The delays are provided by a magnetic disc recorder which employs two reproducing heads spaced appropriately from a recording head to provide the necessary time delays. The delayed and the instaneous color component signals are passed simultaneously through gates triggered open only during the application of particular color component signals to each gate. The color signals are then applied to a matrixor to give the I, Q and Y signals for subsequent reproduction. A short field scanning time for each color may result in simultaneous color signals combined at the desired repetition rate but of short duration. In this case, the signal duration is increased by producing I, Q and Y representative displays which are scanned, by camera tubes, more slowly than the rate at which they are produced. If the field scanning rate is initially that desired, the duration need not be increased. However, half-line delays are imposed during alternate field scansions to artificially interlace the color component signal. Also, selective masking compensates for field-to-field lag by removing small portions of previous color component signals.

Figure 1:
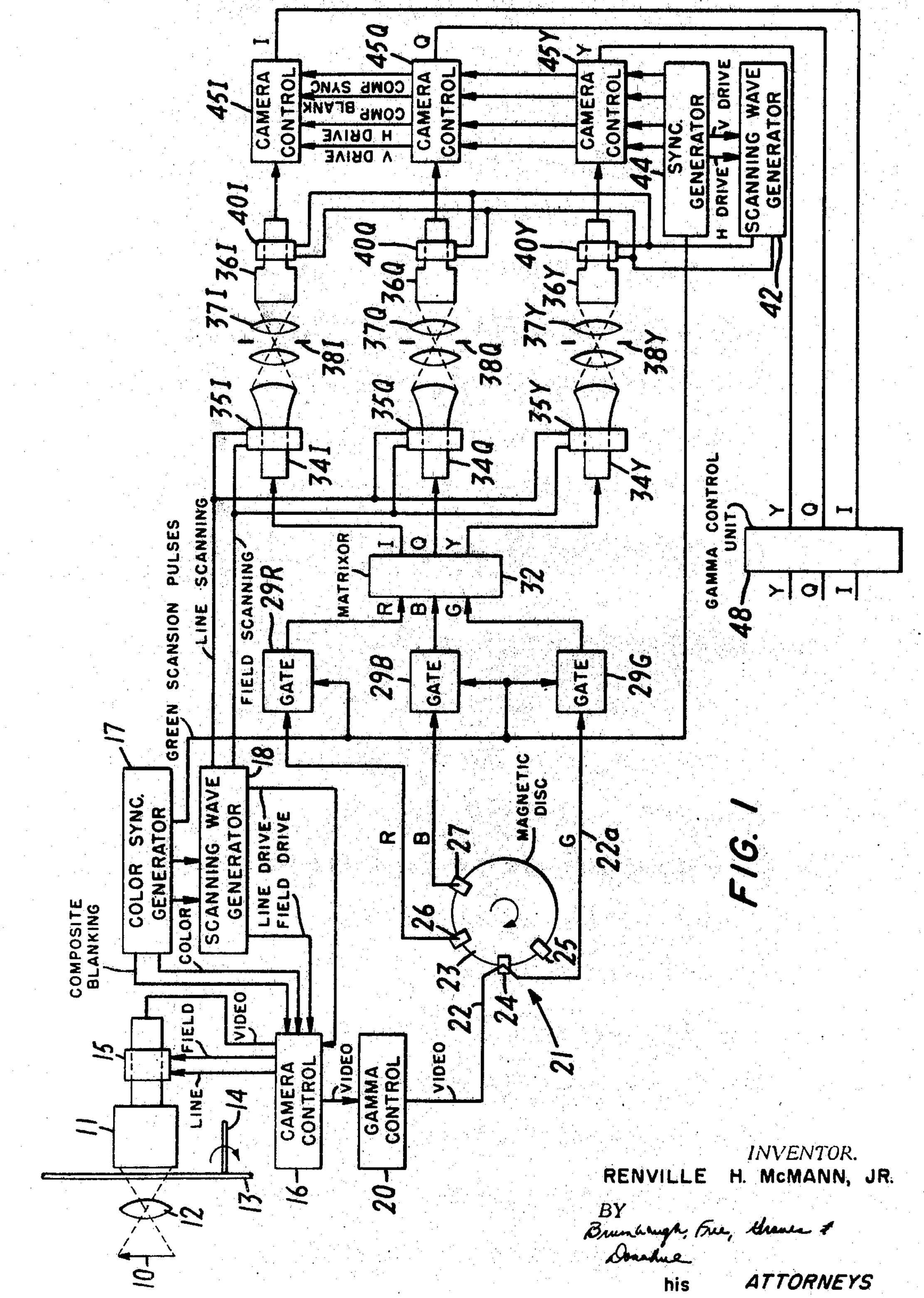

This invention relates to color television systems and, more particularly, to a new and improved color television system providing simultaneous color field signals while retaining the advantages of sequential color field scanning.

One system widely used for the development of color video signals in accordance with the NTSC standards is the simultaneous type system wherein three separate scanning devices, in conjunction with suitable optical arrangements, scan three different colored images of one object field at the same time. One disadvantage with this system is that it is very difficult to maintain registration of the scanning devices, in that exact matching of the scanning patterns in size and linearity is required. Should misregistration result, as is often the case, the detail quality of both the luminance signal Y and chrominance signals I and Q will be impaired since one of the primary colors will be either under-emphasized or over-emphasized. Moreover, the detail and quality of the picture reproduced in monochrome on a black-and-white receiver will be adversely affected since the luminance signal must contain the proper proportion of the three primary colors to enable the black-and-white receiver to reproduce satisfactory pictures in monochrome.

In color television systems utilizing sequential scanning, a single scanning device is used and appropriate color filters are employed to present different primary color aspects of the object field to the camera in succession. The sequential alternation of color signals occurs at a specified field frequency and the persistance of vision at the receiver fuses the successively reproduced color components into a complete picture in natural color. The employment of a single scanning device with a single set of deflection coils and controls avoids the problems of misregistration which are present in the simultaneous color television systems.

Attempts have been made heretofore to devise arrangements which retain the advantages of sequential scanning systems while conforming to the simultaneous broadcast standards. Most of these systems, however, have not been commercially acceptable because of a high degree of inherent color degradation and distortion. One of the primary reasons for the inferior quality of such systems has been the inability to provide an adequate signal conversion arrangement whereby three sequentially derived color video signals are converted into three simultaneous signals, each signal including the proper proportion of color components.

In order to overcome the disadvantages of those prior systems the present invention provides color television apparatus including an arrangement for proportionately delaying the transmission of two sequentially derived color field signals so as to cause them to become simultaneous with the third color signal. More particularly, a delaying arrangement is provided which includes a movable record medium and recording and reproducing devices for the two signals to be delayed which are disposed with respect to the path of motion of the medium so as to record the two signals to be delayed and reproduces them after different intervals from the time of recording and simultaneously with the occurrence of the third sequential color field signal. In one embodiment utilizing the invention a sequential color video signal from a sequential color camera device, having successive portions represent different color components of an object field, is applied to a magnetic record disc. At spaced intervals about the disc, reproducing devices select the two signals to be combined with the remaining signal so as to conncidentally align the portions of the signal which represent different color components.

The signal conversion apparatus preferably includes a plurality of gates responsive to the aligned portions of the video signals and to a control signal representative of a field scansion in a selected primary color so as to pass the different aligned portions of the signal simultaneously. In addition, a matrixing device, which mixes the simultaneous color signal portions so as to simultaneously produce the standard luminance and chrominance video signals from the color components may also be provided.

Figure 2:
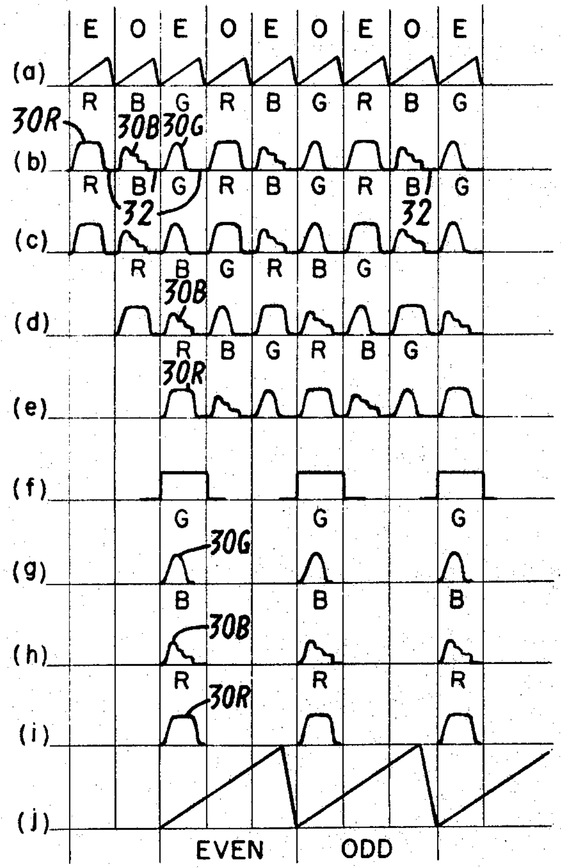
Figure 3:
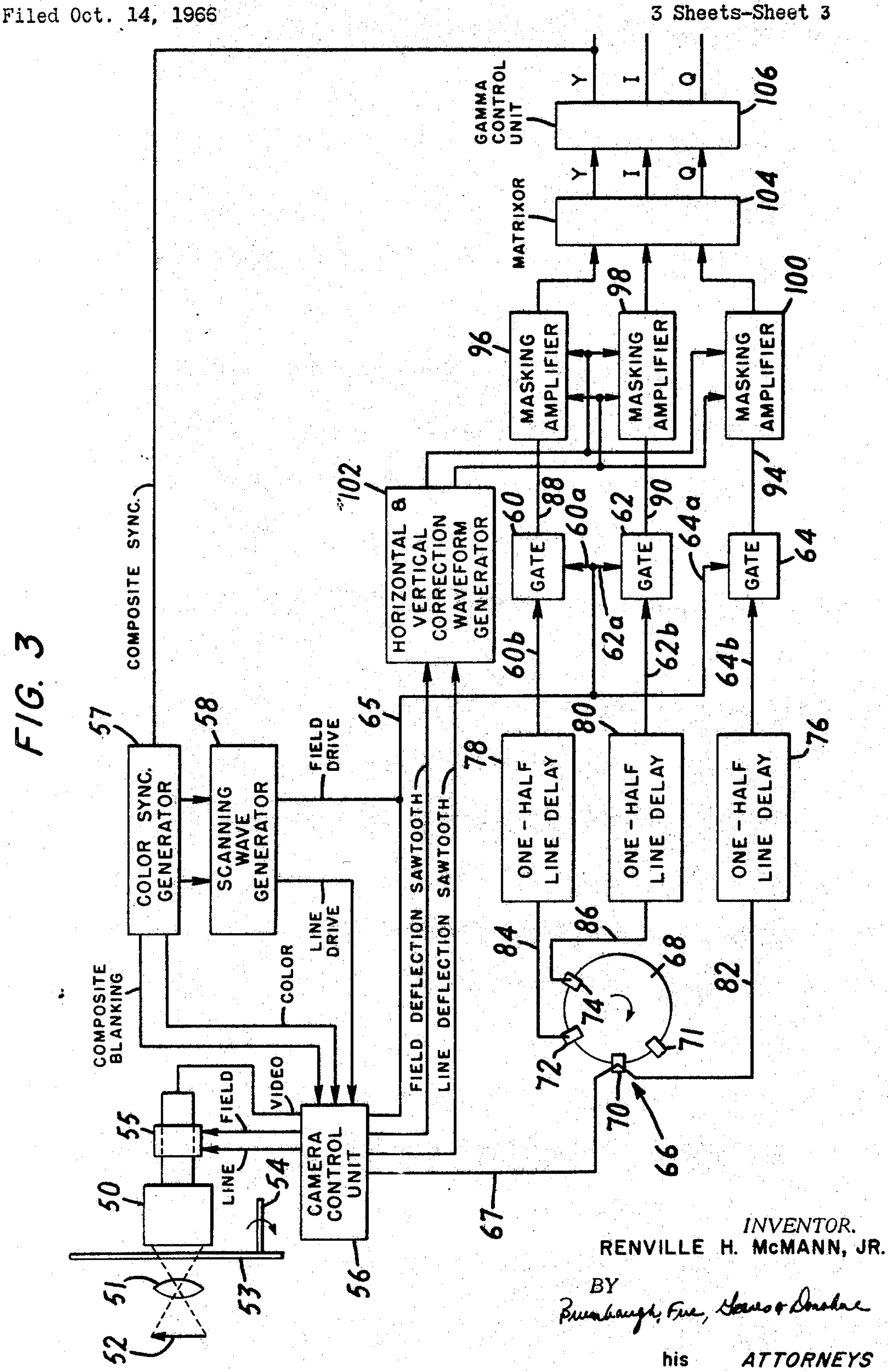

Further objects and advantages of the invention will be apparent from a reading of the following description of a specific embodiment thereof, taken in conjunction with the accompanying drawings; in which FIGURE 1 is a schematic block diagram illustrating the arrangement of one embodiment of the invention;

FIGURE 2 is a graphical representation of a series of wave forms useful in explaining the system of FIGURE 1; and FIGURE 3 is a schematic block diagram illustrating the arrangement of another embodiment of the invention.

Referring to FIGURE 1, an object field 10 is scanned by a color television camera of the sequential type. As shown, the camera includes a scanning device 11 of the image orthicon type with a cooperating lens 12 which focuses images of the object field 10 on the light sensitive surface of the scanning tube 11. Between the lens 12 and the device 11 there is interposed a color filter device 13 which sequentially presents different color aspects of the object field to the scanning device 11. The color filter device is here shown as a disc rotating about an axis 14, the disc having one or more sets of color filters arranged around the periphery thereof so that, as the disc rotates, different color filters are interposed in the path of the light to the tube 11.

The color characteristics of the filters in the disc 13 are selected, in conjunction with the spectral characteristic of the camera tube 11, to yield color signal components of such character that when the color picture is eventually reproduced at a receiver, it will have the proper color quality. Color standards are commonly specified in transmission standards and the filters are chosen accordingly, as is understood in the art. Commonly, they are selected so that when the camera is scanning a specified white object field, signal voltages of equal amplitude are obtained for the several color components.

The scanning beam in the tube 11 is deflected in the line and field directions by a suitable scanning yoke 15, energized with respective sawtooth waves from a camera control unit 16. In the specific arrangement shown, the camera is of the field sequential type and the color disc is rotated in synchronism with the field scansions so that the color changes from one field scansion to the next. In order to obtain synchronization of the camera and associated units, a color synchronizing generator 17 is provided which generates line and field drive pulses of suitable frequency. In a specific apparatus which has been operated with success in the field, the field scansion frequency is a nominal 180 cycles per second and the line scansion frequency is a nominal 47,250 cycles per second in order to produce a 525 line, double-interlaced scanning pattern. To maintain proper color synchronization, the generator 17 also produces distinctive color synchronizing pulses which recur at the frequency of a selected color, say green. Thus, the color pulses have a frequency of 15,750 pulses per second. The generator 17 also produces a composite line and field blanking signal in accordance with usual practice.

The line drive pulses are supplied from the generator 17 via a scanning wave generator 18 to the camera control unit 16 as indicated by the labeled lines in FIGURE 1. Line deflecting sawtooth waves are produced in the unit 16 and supplied to the deflection yoke 15 of the camera tube 11. Field drive pulses are supplied from the generator 17 by way of the generator 18 to the unit 16 as indicated by the labeled lines and field deflection sawtooth waves produced in the unit 16 are supplied to the deflection yoke 15.

For convenience, the color synchronizing generator 17 may be synchronized with the 60 cycle power line so that the field frequency is an exact multiple of the 60 cycle power. A synchronous motor (not shown) may be used to drive the shaft 14 of the color disc so that the disc will rotate in synchronism with the field scansions. Provision is made for controlling the phase of the rotating disc with respect to the 60 cycle mains so that the proper phase may be maintained between the color segments of the disc and the corresponding field scansions.

The sequential color video signal developed by the camera tube 11 is supplied to the camera control unit 16 as indicated and combined therein with the composite line and field blanking waves from generator 17. Thereupon, the video signal is supplied to a gamma control unit 20 whose output is fed to a magnetic disc recorder 21 through a conductor 22 and to a gate 29G via a conductor 22*a*. As will be discussed in more detail later, it suffices that the gamma control unit 20 corrects for the transfer gradient of subsequent cathode ray tubes used in the present system so as to provide the color components of the object field with the proper amplitude and phase relation.

The magnetic disc recorder 21 is here shown as having a circular disc 23 which rotates adjacent to a suitably placed recording or write head 24, an erase head 25 and two reproducing or read heads 26 and 27. In the specific arrangement shown, the disc 23 of the recorder 21 is rotated in synchronism with the color video signals so that one complete color picture is recorded for each revolution of the disc, a synchronous motor (not shown) being used to drive the disc 23 so that the disc rotates in synchronism with the video signals. It will be understood, however, that other rates of disc rotation not necessarily related to the video signal rate, may be used provided the spacing of the transducers 26 and 27 from the recording head is properly selected.

While several different types of commercially obtainable storage devices may be used in the instant invention including, for example, magnetic tape systems a disc recorder is preferred. The disc, being rigid, can be easily synchronized with the video signals and the unit reproduces the stored color video signals with substantially no distortion. One commercially marketed disc recorder used with success in the instant invention is the MVR video disc recorder manufactured by Machtronics, Inc. which employs a metallic disc having a diameter of 14 inches, has a maximum storage capacity of 1600 color pictures and operates at a disc speed of 1800 r.p.m. The disc 23 comprises a number of tracks upon which the color information is stored. For a rotation speed equal to the reproduction rate of the complete picture the first reproducing head 26 is placed 60° from the recording head 24 and the second reproducing head 27 is placed 120° from the recording head.

The gamma corrected sequential color video signal is also supplied from the output of the gamma control unit 20 via the conductor 22*a* to a gate 29G. The gate 29G may comprise any type circuitry, well known in the art, which in response to two or more signals simultaneously applied to its input terminals provides an output signal representative of one of the applied input signals. While gates of the above-mentioned type are well known in the art, gated emitter-follower transistor circuits have been employed successfully in the instant invention.

The operation of the magnetic disc recorder 21 and the gate 29G will be more clearly understood by reference to FIGURE 2. FIGURE 2*a* shows the field scanning sawtooth waves as applied to the deflection coil 15 by the camera control unit 16. Each field scansion is 1/180 of a second in duration and successive field scansions represent even and odd interlaces as indicated by the letters E and O of the top of FIGURE 2. With a three color system assumed, successive field scansions correspond to red, blue and green aspects of the object field as indicated by the letters R, B and G below the graph of FIGURE 2*a*.

Referring to FIGURE 2*b*, there is represented the composite sequential color video signal developed by the camera 11. During the first field scansion, the red segment of the disc filter 13 is interposed in the light path to the camera and the even lines of the image are scanned to produce a red component as indicated at 30R. At the end of the field scansion, the video signal is blanked out by the composite blanking signal as idicated at 32 so that no signal is developed during the retrace of the field sawtooth wave. During the second field scansion, the blue segment of the filter is interposed in the light path to the camera and the odd lines of the image are scanned to produce a blue component as indicated at 30B. During the third field scansion the green segment of the filter is interposed in the light path to the camera and the even lines of the image are scanned to produce a green component as indicated at 30G. The process continues until at the end of six field scansions both odd and even lines have been scanned in each of the colors.

The composite video signal, as mentioned above, is applied simultaneously to the input terminals of the magnetic disc recorder 21 and the gate 29G by the conductors 22 and 22*a*, respectively. In first considering the operation of magnetic disc recorder 21, the composite video signal is stored upon the rotating disc 23 through the recording head 24 and appropriate recording electronics. Since one color picture is recorded every revolution on a specific track of the disc and each color picture consists of six field scansions, the six signals which represent the primary color components scanned in even and odd lines can be viewed as being recorded on the disc at equidistant spacings from each other. Thus, the red component of the video signal 30R is received by the recording head 24 and recorded on the disc during the first sixth of a complete revolution, the blue component during the next sixth of a complete revolution and so on until the entire video signal is recorded. The reproducing head 26 is, as mentioned above, displaced 60° from the recording head 24 such that the red component 30R is sensed by the reproducing head 26 and amplified by the appropriate electronics at exactly the same time that the read head 24 is sensing and reading the blue component 30B.

This is shown in FIGURE 2*d*, wherein the output of the reproduce head 26 lags the input to the read head 24 by 1/180 of a second which is the length of time it takes to scan one object field. The reproduce head 27 is similarly displaced from the reproduce head 26 by one scansion interval and from the recording head 24 by two scansion intervals and thus it senses and amplifies the input video signal two scansion intervals after the signal is initially read and stored on the disc, as shown in FIGURE 2*e*. The erase head 25, consistent with good engineering practice, erases the stored information each revolution, and readies the disc for the next complete color video signal to be stored on the disc during the next revolution. Alternatively, the information for successive complete signals may be stored on successive tracks of the disc, and the erasing operation could be effected after the entire disc is filled with color information rather than erasing the stored information after each revolution.

FIGURE 2*c* represents the output color video signal from the gamma control unit 20 as applied to a gate 29G at the same time that it is applied to the recording head 24. As shown in FIGURE 2*d*, the output video signal from the read head 26 of the magnetic disc recorder 21, which is applied to another gate 29B, contains the same color components as the video signal applied to the gate 29G but lags that signal by a period of one field scansion. Similarly, the output signal from the read head 27 of the magnetic disc recorder 21 is, as shown in FIGURE 2*e*, applied to a gate 29R and lags the applied input color video signal to the gate 29G by two scansions and the input signal to the gate 29B by one scansion. The gates 29R and 29B are of similar construction to that of 29G and, accordingly, they pass the signals applied to them when actuated by the control signal applied to the gate 29G. FIGURE 2*f* illustrates the control signal or blanking signal generated by the color synchronizing generator 17 each time the camera is exposed to the green segment of the filter disc 13 while it is scanning the object field 10. This signal is applied to all of the gates in such a polarity as to enable the gates 29G, 29B and 29R to pass the applied signal inputs only during the time of the green scansions of the sequential video signal and to blank out the gates during the blue and red scansions. Thus, during every six field scansions, as shown in FIGURES 2*g*, 2*h*, and 2*i*, the gates 29G, 29B and 29R simultaneously pass the color components of the video signals, the odd lines and even lines being transmitted alternately.

FIGURE 2 illustrates that, by delaying the entire sequential color video signal for a period of one field scansion and then delaying the signal for a period of two field scansions there are produced three video signals having their respective green, red and blue color components aligned as shown in FIGURES 2*c*, 2*d* and 2*e*. Although either a blue field scansion or a red field scansion pulse might be used to actuate the gates, a certain amount of information is lost by the recording and reproducing operation which would be most noticeable in the green signal. For this reason, it is preferred to extract the green signal directly from the composite video signal and delay the red and blue signals by the recording technique described herein.

The red component 30R of the video signal is passed through the gate 29R at the same time the blue component 30B of the video signal is being passed through the gate 29B and the green component 30G is being passed through the gate 29G and the three color components are simultaneously applied to a matrixor 32. In the matrixor 32, the signals are combined in a suitable manner by addition and substraction to simultaneously yield the proper color components for the standard Y, I and Q signals. Details of such matrixing circuits have been described in the literature and need not be discussed here.

The three Y, I and Q signals are applied simultaneously to three cathode ray tubes 34Y, 34I and 34Q respectively for reproduction and the deflection coils 35Y, 35I and 35Q of the cathode ray tubes are supplied with line and field sawtooth scanning waves from the scanning wave generator 18. By supplying the deflection yokes in parallel with the suitable scanning waves, it is possible to obtain images on the tubes which are substantially identical in size and linearity. It should be noted, however, that even if misregistration resulted, the luminance signal would not be impaired since the proper proportions of the primary colors have already been incorporated into the signal by the matrixor 32. Should misregistration occur, some loss of color intensity may result in a color television receiver but not loss of detail in either a color or a black-and-white receiver. The scanning frequencies for the tubes 34Y, 34I and 34Q are the same as those employed for the scanning device 11, and in this illustrated embodiment, are 180 fields per second, 525 lines double-interlaced.

Cooperating with the cathode ray tubes 34I, 34Q and 34Y are three pickup scanning devices here shown as camera tubes 36I, 36Q and 36Y, with associated projection lenses 37I, 37Q and 37Y. If necessary, adjustable diaphragms 38I, 38Q and 38Y may be added to vary the apertures of the lenses so as to obtain a suitable light level for the scanning devices. The luminance and chrominance signals simultaneously produced by the matrixor 32 are substantially representative of the NTSC signals except for the fact that the field scansion rate is 180 fields per second, double-interlaced, rather than the 60 fields per second double-interlaced. The cathode ray tubes and associated camera tubes form the means for converting the simultaneous luminance and chrominance signals into signals meeting the NTSC standards as to frequency and duration.

The camera tubes are provided with respective deflection yokes 40I, 40Q and 40Y which are driven by suitable sawtooth field and line scanning waves generated by a scanning wave generator 42. A synchronous generator 44 generates the suitable vertical and horizontal drive pulses which are applied to the scanning wave generator 42 and to the camera control units 45I, 45Q and 45Y associated with the respective scanning devices the vertical scan signal being synchronized with the gate signals applied to the gates 29R, 29B and 29G so as to initiate scanning by the cameras at the time the cathode ray tubes are actuated. The relationship between the horizontal and vertical drive pulses is selected to yield a 525 line double-interlaced picture in accordance with the conventional monochrome transmission standards, more particularly, a vertical drive frequency of nominally 60 cycles and a horizontal drive frequency of 15,750 cycles. The synchronizing generator 44 also develops composite blanking and composite synchronizing signals in the usual manner and applies them to the three camera control units. The camera control units, in response to the signals generated by the synchronizing generator 44 and to the video signals produced by their respective camera tubes provide the proper luminance and chrominance signals suitable for either black-and-white television receivers or color television receivers.

The operation of the cathode ray tubes 34Y, 34Q and associated camera tubes 36Y, 36Q and 36I and control electronics will be more clearly understood by reference to FIGURE 2. The chrominance signals I and Q and the luminance signal Y of the derived color video signal are applied simultaneously to the cathode ray tubes 34I, 34Q and 34Y respectively, during a field scansion of 1/180 of a second, as shown in FIGURES 2*g*, 2*h* and 2*i*. As shown in FIGURE 2*j*, a field scansion by the scanning devices 36Y, 36Q and 36I takes place in approximately 1/60 of a second. Thus, it takes three times as long for the camera tubes to scan the faces of the cathode ray tubes 34I, 34Q and 34Y as it takes for the picture to be initially placed thereon. By selecting a phosphor suitable for 60 cycle double-interlaced scanning, such as, for example, willemite, the luminance and chrominance signals in their transformed appearances as images on the faces of the cathode ray tubes will be satisfactorily reproduced by their associated camera tubes.

The phase relation between the 180 cycle field scansion waves applied to the camera tube 11 and to the cathode ray tubes 34Y, 34Q and 34I and the 60 cycle field scansion waves applied to camera tubes 36Y, 36Q and 36I as shown in FIGURE 2, is the preferred relationship since the camera tubes are scanning the odd lines of the images reproduced on the faces of the cathode ray tubes at the same time the camera tube 11 is scanning the odd lines of the object field 10 and the camera tubes are scanning the even lines of the reproduced images at the same time the camera tube 11 is scanning the even lines of the object field. This is accomplished by employing the green field scansion blanking pulses to gate the color components of the derived video signal through the gates 29R, 29B and 29G and to initiate the vertical scan in the camera tubes 36Y, 36Q and 36I.

Cathode ray tubes such as the tubes 34Y, 34I and 34Q commonly possess a curved transfer characteristic resulting in a transfer gradient which ranges from 2.5 to 3.5. The gamma control unit 20 is therefore added to correct the video signals derived by the camera tube 11 before they are stored by the magnetic disc recorder 21 and subsequently reproduced by the cathode ray tubes 34Y, 34I and 34Q, so that the images reproduced on the face of the cathode ray tubes represent the proper luminance and chrominance signals of the object field 10.

The signals developed by the camera tubes 36Y, 36I and 36Q are then combined with the proper line and field blanking signals in the camera control units 45Y, 45I and 45Q and applied to another gamma control unit 48. This gamma control unit is employed to compensate for the transfer gradient of the cathode ray tubes employed in conventional black-and-white and color receivers, as is usually done in the standard television systems.

As presently contemplated, the Y signal representing the luminance of the object field 10 is transmitted at an amplitude modulation of the transmitter carrier in the same manner as conventional black-and-white transmission. The quadrature subcarriers, modulated by the Q and I signals, are likewise transmitted as amplitude modulations of the main carrier. At a conventional black-and-white receiver the Q and I signal components are rendered ineffective by the integration characteristics of the eye and only the Y modulation is effective. In a color receiver the Y components provide the principal detail of the picture and the Q and I components provide the color intensity.

Referring now to FIGURE 3, there is represented another embodiment of the invention for providing simultaneous color field signals. As shown, the camera includes a scanning device 50 of the image orthicon type with a cooperating lens 51 which focuses images of an object field 52 on the light sensitive surface of the tube 50. Between the lens 51 and tube 50 there is interposed a color disc 53 rotating about an axis 54 which serially presents different color aspects of the field 52 to the tube 50. As described above the disc comprises one or more sets of color filters arranged angularly around the periphery thereof so that as the disc rotates different color filters are interposed in the path of the light of the tube 50.

The scanning beam in the tube 50 is deflected in the line and field directions by a suitable scanning yoke 55 energized with respective sawtooth waves from a camera control unit 56. For producing a 525 line double-interlaced scanning pattern a generator 57 is provided which generates line drive pulses at a frequency of 15,750 cycles per second and field drive pulses at a frequency of 60 cycles per second. To maintain proper color synchronization, the generator 57 also produces composite line and field blanking signals and distinctive color synchronizing pulses which recur at the frequency of a selected color, said red. , The line drive pulses are supplied from the generator 57 via a scanning wave generator 58 to the camera control unit 56 as indicated by the labeled lines. Line deflecting sawtooth waves are produced in the unit 56 and supplied to the deflection yoke 55 of the camera tube 50. Field drive pulses are supplied from the generator 57 by way of the generator 58 to the unit 56 as indicated by the labeled lines and are also applied to the input terminal 60*a*, 62*a* and 64*a* of a trio of gates 60, 62 and 64 through a conductor 65. Field deflection sawtooth waves are produced in the unit 56 and supplied to the deflection yoke 55 of the tube 50.

The sequential color video signal developed by the camera tube 50 is supplied to the camera control unit 56 as indicated and combined therein with the composite line and field blanking waves from the generator 57. Thereupon, the video signal is supplied to a magnetic disc recorder 66 through a conductor 67 and recorded thereon. The magnetic disc recorder 66 is here shown as having a circular disc 68 which rotates adjacent to a suitably placed recording or write head 70, an erase head 71 and two reproducing or read heads 72 and 74. As above, an MVR video disc recorder may be employed for storage of the video signals. However, in this embodiment of the instant invention, the disc speed is a nominal 600 r.p.m. rather than the 1800 r.p.m. specified above. For a rotation speed equal to the reproduction rate of the complete picture, the first reproducing head 72 is placed 60° from the recording head 70 and the second reproducing head 74 is placed 120° from the recording head 70. If a rotation speed of 1800 r.p.m. were to be used, the reproducing head 72 would be placed 180° from the recording head 70 and the second reproducing head 74 would be displaced from the recording head 70 by exactly the width of one track.

In considering the operation of the magnetic disc recorder 66, the composite video signal is stored upon the rotating disc 68 through the recording head 70 and the appropriate recording electronics. Since one color picture is recorded every revolution on a specific track of the disc and each color picture consists of six field scansions, the six signals which represent the primary color component scanned in even and odd lines can be viewed as being recorded on the disc 68 at equidistant spacings from each other. Thus, the first color component of the video signal, for example red, is received by the recording head 70 and recorded on the disc during the first sixth of a revolution. The second color component, say blue, is recorded during the next sixth of a revolution and so on until the entire video signal is recorded.

The reproducing head 72 is, as mentioned above, displaced 60° from the recording head 70 such that the red component of the signal is sensed by the read head 72 and amplified by the appropriate electronics at exactly the same time the write head 70 is sensing the blue component of the video signal. The reproducing head 74 is similarly displaced from the head 72 by 60° or one field scansion interval and thus it senses and amplifies the input video signal two field scansions after the signal is initially sensed by the recording head 70 and stored on the disc. The erase head 71 erases the stored information each revolution and readies the disc for the next color picture signal to be stored during the next revolution.

It is apparent that by successively delaying the video signal for a period of one field scansion and then for a period of two field scansions there are produced three video signals having their respective red, blue and green color components aligned. The three aligned video signals are applied simultaneously from the recording head 70 and the reproducing heads 72 and 74 to three one-half line delays 76, 78 and 80, respectively, by way of conductors 82, 84 and 86. The one-half line delays 76, 78 and 80 operated during alternate field scansions and artificially interlace the color component signal by simultaneously aligning the line components of the color component signals which correspond to vertically adjacent picture elements of the scanned mosaic target. The delays are provided in order to prevent color break-up which is likely to result from the employment of slower scansion rates. While other type delay lines may be employed in the instant invention, delay lines of the fused quartz type or the mercury type are preferred because of their low insertion loss characteristic. It should be understood, however, that the artificial interlace introduced by the one-half line delays 76, 78 and 80 may be accomplished in other ways, such as for example, by employing additional pickups on the disc 60 displaced by one-half line.

The output video signals are passed from the one-half line delays 78, 80 and 76 and applied to the second input terminals **60*b*, 62*b* and 64*b* of the gates 60, 62 and 64, respectively, the input signal to the gate 60 lagging the input to the gate 64 by the period of one field scansion and the input signal to the gate 62 lagging the input signal to the gate 64 by the period of two field scansions. The gates 60, 62 and 64** may comprise any type circuitry, well known in the art, which in response to a pair of signals of proper phase and amplitude applied to their respective input terminals provide output signals representative of one of the applied input signals. Gated emitter follower circuits operate in this manner and may be employed in the instant invention.

As mentioned above, the first input terminals **60*a*, 62*a* and 64*a* of the gates are coupled together and to the field drive pulses through the conductor 65. The application of the field drive pulses to the gates 60, 62 and 64 enables the gates to simultaneously pass the different color components of the video signal along conductors 88, 90 and 94 to the input terminals of a trio of conventional masking amplifiers 96, 98 and 100, respectively. The masking amplifiers are coincidentally controlled by a horizontal and vertical correction waveform generator 102 which consists of a pair of sawtooth shading generators and a pair of parabolic shading generators. In response to the field and line deflection sawtooth waves applied to its input terminals, as indicated along the labeled lines, the waveform generator 102** produces sawtooth and parabolic waveforms which are variable both in magnitude and polarity.

The masking amplifiers 96, 98 and 100 and the correction waveform generator 102 are provided to compensate for the field to field lag existing in the pickup tube 50 which causes a certain amount of color to be carried over from one field scansion to the next. The masking amplifiers 96, 98 and 100 correct for this lag by removing a small amount of the red component signal from the blue component signal, a small amount of the blue component signal from the green component signal and a small amount of green signal from the red component signal for each of the three color channels. Quite often the color carryover is worse in the corners of the scanned image than it is in the central portions of the image because the carryover or lag is a function of the scanned raster area. Accordingly, by appropriate control of the waveform generator 102, the sawtooth and parabolic waveforms may be combined to produce a greater amount of masking in the portions of the color signals corresponding to the corners of the scanned raster area of the pickup tube 50 and minimal masking in the portions of the color signals corresponding to the center of the scanned raster area.

After color carryover correction and during each field scansion, the different color components are applied to a matrixor 104. In the matrixor 104 the signals are combined in a suitable manner by addition and subtraction and produced as standard Y, I and Q signals. Additional conversion is obviated by the fact that the field scansion rate is 60 fields per second double-interlaced. The Y, I and Q signals are thereupon applied to a gamma control unit 106 wherein they are compensated for the subsequent transfer gradient of the cathode ray tubes employed in conventional black-and-white and color receivers as is usually done in standard television systems. Further, the detail signal Y is combined with the composite sync pulse produced by the color sync generator 57, as indicated by the labeled lines, in order to avoid any misregistration problems, as is consistent with standard television procedure.

As above, the Y signal is transmitted as an amplitude modulation of the transmitter carrier and the quadrature side carriers, modulated by the I and Q signals, are transmitted as amplitude modulations of the main carrier.

It will be understood that the invention is susceptible to considerable modification and not limited to the above described illustrative embodiments. Accordingly, all modifications and variations within the skill of the art are included within the spirit and intended scope of the invention as defined by the following claims.

I claim:

1. Apparatus for developing color television signals comprising input means for receiving sequential color information signals representing different color components of an object field, delay means for proportionately delaying at least one of said color information signals with respect to another of said signals so as to cause the signals to occur simultaneously, triggering means for electrically selecting the times at which output signals are passed from said delay means to provide at least one series of delayed output signals which correspond to only a single color component, and output means for receiving said simultaneously occurring signals and adapted to produce a signal for color television having different color component information represented simultaneously.

2. Apparatus according to claim 1 wherein the delay means comprises recording means for recording at least two different sequentially occurring color component signals on a moving medium and reproducing means for simultaneously reproducing the two different color components.

3. Apparatus according to claim 2 wherein the recording means comprises magnetic disc record means along with transducer means for recording all of the color information signals sequentially on said disc.

4. Apparatus for developing color television signals comprising input means for receiving sequential color information signals representing different color components of an object field, delay means for proportionately delaying at least one of said color information signals with respect to another of said signals so as to cause the signals to occur simultaneously, and output means for receiving said simultaneously occurring signals and adapted to produce a signal for color television having different component information represented simultaneously, said delay means comprising recording means for recording at least two different sequentially occurring color component signals on a moving medium and reproducing means for simultaneously reproducing the two different color components, said reproducing means comprising a plurality of tranducer means spaced along the moving medium in proportion to its rate of motion and the separation of the recorded color component signals, and a corresponding plurality of gate means for receiving signals from the transducer means and transmitting the signals simultaneously at a selected time.

5. Apparatus according to claim 4 including further gate means for receiving the original sequential color information signals representing different color components and operative simultaneously with said plurality of gate means to transmit an undelayed color component signal simultaneously with the delayed signals.

6. Apparatus according to claim 4 including matrix means responsive to signals received from the plurality of gate means to convert the simultaneously received color component signals to luminance and chrominance signals 7. Apparatus according to claim 4 including image reproducing means for reproducing a plurality of images containing simultaneous information derived from the signals transmitted by the gate means and a corresponding plurality of camera means for converting the reproduced images into electrical signals having a different duration from that of the signals passed by the gate means.

8. Apparatus for developing color television signals comprising image scanning means for developing sequential color information signals wherein successive portions represent different color components of an object field, storage means, recording means for recording at least two successive portions of the color information signals on said storage means, reproducing means for simultaneously reproducing the two successive portions line delay means responsive to an unrecorded portion of the color information signals and to the two recorded portions for artificially interlacing the portions to compensate for losses in resolution occurring in said image scanning means and gating means for receiving the artificially interlaced portions from the line delay means for transmitting the portions simultaneously at a selected time.

9. Apparatus according to claim 8 wherein the successive portions of the color information signals represent successive field scansions in different primary colors and the gating means transmits the portions each field scansion.

10. Apparatus according to claim 8 including further masking amplifier means responsive to the simultaneously transmitted portions for removing color component carryover in each of the transmitted portions as a function of the scanned raster area of said image scanning means.

11. Apparatus according to claim 10 including further waveform correction means coupled to said masking amplifier means for providing a greater amount of correction for the color carryover in the parts of the transmitted portions corresponding to the corners of the scanned raster area and a smaller amount of correction for the color carryover in the parts of the transmitted portions corresponding to the center of the scanned raster area of said image scanning means.

12. Apparatus for developing color television signals comprising input means for receiving sequential color information signals representing different color components of an object field, delay means for proportionately delaying at least one of said color information signals with respect to another of said signals so as to cause the signals to occur simultaneously at spaced intervals, and output means for receiving said simultaneously occurring signals including means for producing signals of increased duration having the information content of said simultaneously occurring signals, thereby reducing the time between successive signals.

13. Apparatus according to claim 12, wherein the duration increasing means includes means for producing displays containing the information of the simultaneously occurring signals, and means for scanning the displays at a rate slower than the rate at which the displays are produced to provide signals representative of said delays.

14. Apparatus for developing color television signals comprising means for developing sequential color information signals by the sequential scanning of a raster area to produce successive signals representing different color components of an object field, input means for receiving the sequential color information signals, delay means for proportionately delaying at least one of said color information signals with respect to another of said signals so as to cause the signals to occur simultaneously, output means for receiving said simultaneously occurring signals to produce a signal for color television having different color component information represented simultaneously, and masking means responsive to a simultaneously transmitted signal for removing color component carryover in each of the simultaneously occurring color component signals as a function of the scanned raster area of said image scanning means.

15. Apparatus according to claim 14 including further waveform correction means coupled to said masking means for providing a greater amount of correction for the color carryover in the parts of the simultaneous signals corresponding to the corners of the scanned raster area, and a smaller amount of correction for the color carryover in the parts of the simultaneous signals corresponding to the center of the scanned raster area of said image scanning means.

References Cited

UNITED STATES PATENTS 3,267,207 8/1966 Okazaki et al. ------- 178—5.2
3,336,437 8/1967 Brouard et al. ------- 178—5.4

ROBERT L. GRIFFIN, Primary Examiner

R. MURRAY, Assistant Examiner

U.S. Cl. X.R.

178—5.4

PO-1050
(5/69)

UNITED STATES PATENT OFFICE
CERTIFICATE OF CORRECTION

Patent No. 3,506,775 Dated April 14, 1970

Inventor(s) Renville H. McMann, Jr.,

It is certified that error appears in the above-identified patent and that said Letters Patent are hereby corrected as shown below:

Column 2, line 36, "conncidentally" should be -- coincidentally --; Column 4, line 55, "idicated" should be -- indicated --; Column 9, line 13, "operated" should be -- operate --; Col. 9, line 69 "green signal" should be -- green component signal --; Column 12, line 32, "signal" should be -- signals --; Column 10, line 74, "tranducer" should be -- transducer --.

SIGNED AND SEALED
SEP 8 - 1970

(SEAL)
Attest:

Edward M. Fletcher, Jr.
Attesting Officer

WILLIAM E. SCHUYLER, JR.
Commissioner of Patents